Nov. 29, 1949 S. E. MORRAL ET AL 2,489,495
GREEN CORN PICKER
Filed Jan. 30, 1946
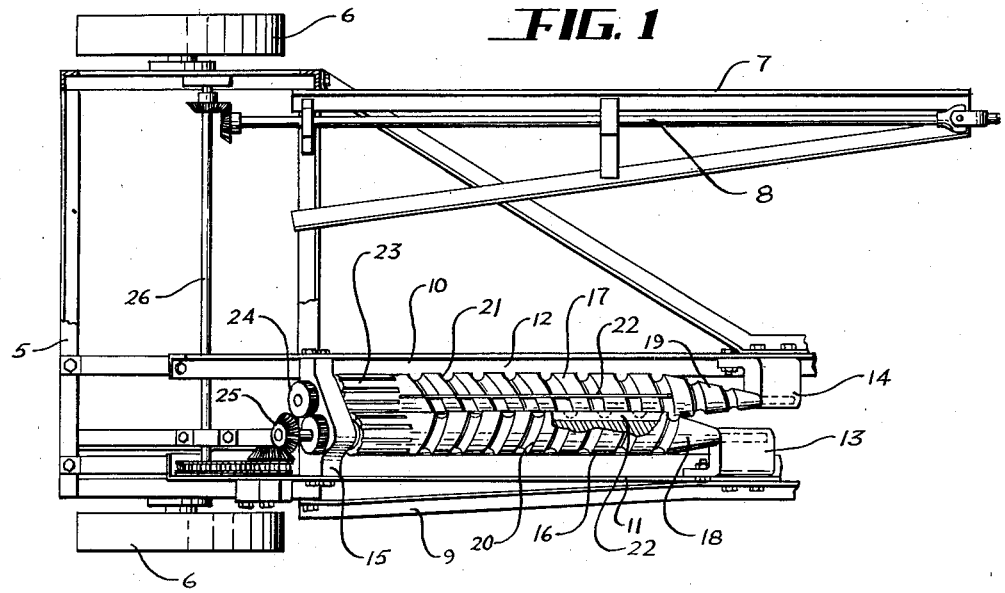
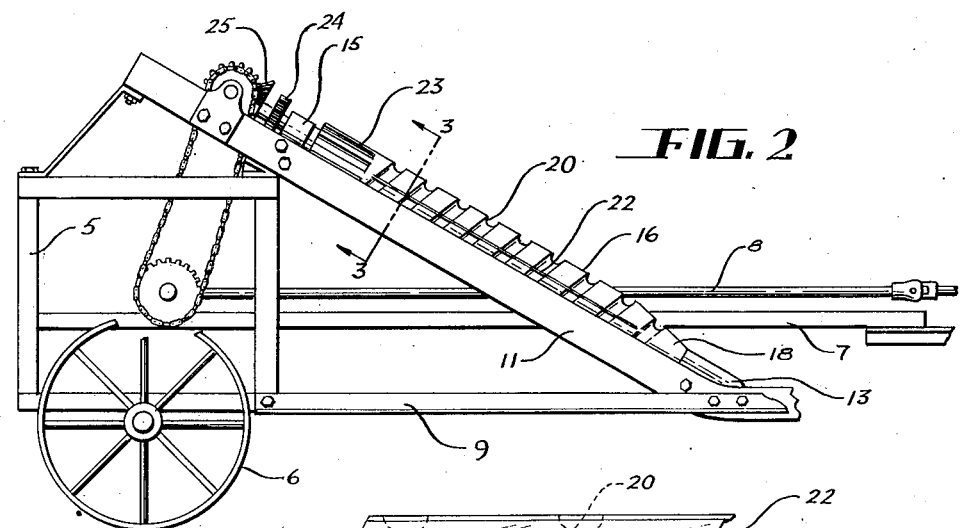
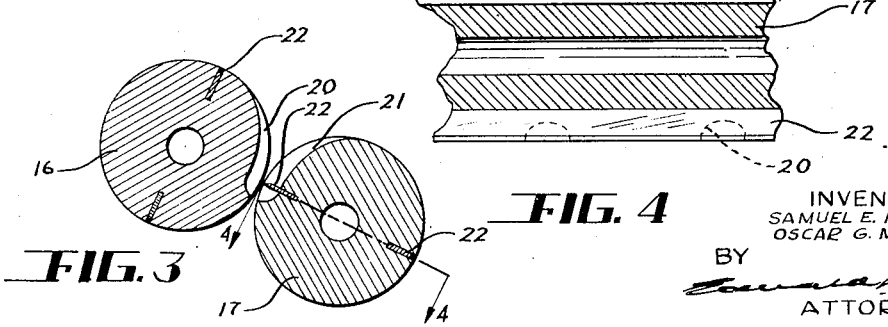
INVENTOR
SAMUEL E. MORRAL
OSCAR G. MORRAL
BY
ATTORNEY Patented Nov. 29, 1949

2,489,495

UNITED STATES PATENT OFFICE 2,489,495

GREEN CORN PICKER

Samuel E. Morral and Oscar G. Morral, Morral, Ohio, assignors to Morral Bros., Inc., Morral, Ohio, a corporation of Ohio Application January 30, 1946, Serial No. 644,217

7 Claims. (Cl. 56—104)

This invention relates to a green corn picker, that is a machine for removing ears of green corn from the stalks in the field.

Pickers for dry, or ripe, corn are in extensive use but these pickers are not suitable for picking green corn, because of the different conditions of the stalks and ears at the time of picking and the necessity of preventing injury to the soft kernels of the green ears.

One object of the invention is to provide a picker which will remove ears of green corn from standing stalks without bruising or otherwise injuring the kernels of the ears.

A further object of the invention is to provide such a picker which will sever the ears of corn from the standing stalks without severing the stalks.

A further object of the invention is to provide such a picker which will sever the ears from the stalks without cutting through the butt of the ear or otherwise loosening the husks.

A further object of the invention is to provide such a picker in which the devices for severing the ears from the stalks are carried by the rolls which move along the opposite sides of the row of stalks, and are so arranged that they will sever the stems of the ears without severing the stalks entirely.

Other objects of the invention may appear as the picker is described in detail.

In the accompanying drawings, Fig. 1 is a plan view of an enlarged corn picker embodying our invention; Fig. 2 is an enlarged side elevation of the picker; Fig. 3 is a transverse section through the picking elements on the line 3—3 of Fig. 2; and Fig. 4 is a longitudinal section taken through a portion of one of the picking rolls on the line 4—4 of Fig. 3.

In these drawings we have illustrated one embodiment of our invention and have shown the picking elements as mounted on a tractor propelled supporting frame, but it is to be understood that the picking elements may take various forms and may be supported and propelled in any suitable manner.

The supporting structure is here shown in skeletonized form to facilitate illustration and it comprises essentially a main frame supported by wheels 6 and including upper and lower longitudinal members 5 and 5a, upright members 5c and 5d connecting the upper and lower longitudinal members, and transverse members 5e and 5f connecting the longitudinal side members. Connected with one side of the main frame is a forwardly extending structure 7 adapted to be connected with the draw bar of a tractor. Mounted on this forwardly extending structure is a driving shaft 8 having means whereby it may be connected with the power output shaft of the tractor for the purpose of rotating the picking elements, as will hereinafter appear. Rigidly secured to and extending forwardly from the rear portion of the frame are lower frame members 9 and 10, which are preferably in the form of angle bars. Arranged above the lower members 9 and 10 are upper frame members 11 and 12, preferably angle bars, which are inclined downwardly and forwardly at a substantial angle to the members 9 and 10. The frame members 11 and 12 are rigidly mounted at their rear ends on the main frame 5 and are secured at their lower ends to the lower frame members 9 and 10. The frame members 11 and 12 are provided adjacent their lower ends with bearings 13 and 14 and adjacent the upper ends of these inclined members are other bearings in axial alinement respectively with the bearings 13 and 14 and here shown as formed in a single bearing member 15.

Mounted in the respective pairs of alined bearings are two picking elements, or rolls, 16 and 17 which are arranged close one to the other for rotation in opposite directions about parallel axes and are adapted to receive between them the stalks of corn as the picker is advanced along a row of such stalks. To facilitate the entrance of the stalks of corn between the rolls the latter are provided at their forward ends with tapered portions 18 and 19. We have also shown one roll, in the present instance the roll 16, as of the length slightly less than the length of the roll 17 so as to further facilitate the entrance of the corn stalks between the rolls. Each roll is provided with a spiral groove, 20 and 21, each groove extending for the major portion of the length of the roll. The grooves of the two rolls are so arranged that corresponding convolutions thereof will be in opposed relation one to the other at all points between the two rolls to receive the stalks of corn, and the rotation of the rolls will maintain the stalks which are in the grooves in substantially upright positions as the picker advances along the row of stalks.

To prevent more than one stalk from entering, or attempting to enter, the grooves the roller 17 extends forwardly beyond the roll 16 and the groove in roller 17 extends for some distance about the tapered portion thereof, while the groove in roll 16 does not extend materially beyond the cylindrical portion of that roll. Thus as the tapered end of roll 17 moves past the stalk the latter will enter the groove therein and be guided by that groove into the groove in roll 16, and the adjacent stalk is prevented from entering the groove in roll 17 until that groove has completed the rotation after engaging the first mentioned stalk.

Mounted on one or both of the rolls, preferably on both rolls, are one or more severing devices which intersect convolutions of the grooves in the respective rolls and are arranged with their cutting edges adjacent the peripheral surfaces of the respective rolls, as is more clearly shown in Fig. 3. In the particular arrangement illustrated each roll is provided on each side of its axis with a longitudinal blade 22 which extends for the major portion of the length of the roll and intersects substantially all the convolutions of the groove. Preferably the two blades of each roll are in a plane at substantially right angles to the plane of the blades in the other roll, so that the four blades will be brought successively to operative positions between the two rolls. The depths of the grooves are such that the combined depths of the opposed portions of the two grooves will be substantially greater than the average thickness of the stalks of corn. Consequently as the rolls move along the row of stalks the blades will engage the stalks but will not sever the same. A thick stalk may be cut more or less but the rolls will immediately pass above the cut portion so that the stalks, although slightly weakened, will be maintained in substantially an upright position. As the rolls move along the row of stalks the ears of corn on the stalks will be brought into engagement with the rolls, the points at which this occurs depending upon the heighth of the ears above the ground. As an ear contacts the rolls the stem of the ear is drawn into opposed portions of the convolutions of the grooves along with the stalk of corn, thus substantially filling the two grooves so that the blade engaging the stem will cut through the stem and sever the ear, without completely severing the stalk. The diameter of the rolls and their arrangement with relation one to the other is such that the butt of the ear cannot enter the space between the rolls and therefore there is no possibility of the blades cutting through the butt or otherwise loosening the husks, and in picking green corn it is essential that the husks should remain intact until the corn has reached the canning factory. Further, the butts of the ears do not enter between the rolls sufficiently to cause the kernels to be bruised or otherwise injured. As the rolls continue to move with relation to the row of stalks the upper ends of the rolls pass beyond the stalks and if desired the upper portions of the rolls may be provided with roughened or ribbed portions 23 which will positively and quickly move the tops of the stalks beneath the rolls. The rolls may be rotated in any suitable manner and as here shown the two rolls are provided beyond the upper bearings with intermeshing gears 24 to cause them to rotate in unison in opposite directions and the shaft of one roll, in the present instance the roll 16, is connected through gearing 25 and a shaft 26 with the driving shaft 8, which is driven by the tractor.

It is desirable that the severed ears should all fall on the same side of the picking elements and for this purpose the roll 16 is here shown as mounted on an axis slightly higher than the axis of the roll 17. It is customary to provide a corn picker with a conveyor to receive the severed ears and convey the same to a suitable point of discharge and means may also be provided, in the nature of a conveyor, to engage the stalks above the rolls and assist in maintaining the same in upright positions. Inasmuch as these devices form no part of the present invention they have been omitted for the sake of clearness of illustration.

Thus it will be apparent that as the picker is moved along the row of corn stalks the stems of the ears on the several stalks are drawn successively between the rolls and are severed, the severance taking place without loosening the husks or bruising the ears of corn, and the ears are discharged from the rolls without being bruised or otherwise injured.

While we have shown and described one embodiment of our invention we wish it to be understood that we do not desire to be limited to the details thereof as various modifications may occur to a person skilled in the art.

Having now fully described our invention, what we claim as new and desire to secure by Letters Patent, is:

1. In a green corn picker, two rolls rotatable about substantially parallel inclined axes, having means to guide stalks of corn between them and having opposed spiral grooves to embrace said stalks of corn and maintain the same in substantially upright positions, a blade mounted in one of said rolls extending lengthwise thereof and intersecting a plurality of convolutions of the groove in that roll, and means for moving said rolls along a row of corn stalks and for rotating said rolls in opposite directions.

2. In a green corn picker, two rolls rotatable about substantially parallel inclined axes, having means to guide stalks of corn between them and having opposed spiral grooves to embrace said stalks of corn and maintain the same in substantially upright positions, blades mounted in the respective rolls with their cutting edges extending lengthwise of the rolls adjacent the peripheral surface of the latter, each blade intersecting at least one convolution of the groove in the roll in which that blade is mounted, and means for moving said rolls along a row of corn stalks and for rotating said rolls in opposite directions.

3. In a green corn picker, two rolls rotatable about substantially parallel inclined axes having means to guide stalks of corn between them and having opposed spiral grooves to embrace said stalks of corn and maintain the same in substantially upright positions, a plurality of blades mounted in one of said rolls and spaced about the axis thereof with their cutting edges extending lengthwise of the roll and into the groove in said roll, and means for moving said rolls along a row of corn stalks and for rotating said rolls in opposite directions.

4. In a green corn picker, two rolls rotatable about substantially parallel inclined axes, having means to guide stalks of corn between them and having opposed spiral grooves to embrace said stalks of corn and maintain the same in substantially upright positions, two blades mounted in each roll on opposite sides of the axis thereof, each blade extending for a substantial portion of the length of its roll and through a plurality of convolutions of the groove in said roll, the blades of each roll being in a plane at substantially right angles to the plane of the blades in the other roll, and means for moving said rolls along a row of corn stalks and for rotating said rolls in opposite directions.

5. In a green corn picker, two rolls rotatable about substantially parallel inclined axes, having means to guide stalks of corn between them and having opposed spiral grooves to embrace said stalks of corn and maintain the same in substantially upright positions, one of said rolls extending forwardly beyond the other roll and the groove in the longer roll extending beyond the groove in the shorter roll, blades mounted in the respective rolls and extending lengthwise thereof through successive convolutions of the grooves therein, and means for moving said rolls along a row of corn stalks and for rotating said rolls in opposite directions.

6. In a green corn picker, two rolls rotatable about substantially parallel inclined axes, having means to guide stalks of corn between them and having opposed spiral grooves to embrace said stalks of corn and maintain the same in substantially upright positions, blades mounted in the respective rolls and extending through the convolutions of the respective grooves to sever the stems of ears of corn which enter opposed portions of said grooves, the axis of one of said rolls being slightly higher than the axis of the other roll to cause all severed ears to fall in the same direction, and means for moving said rolls along a row of corn stalks and for rotating said rolls in opposite directions.

7. In a green corn picker, two rolls rotatable about substantially parallel inclined axes, having means to guide stalks of corn between them and having opposed spiral grooves to embrace said stalks of corn and maintain the same in substantially upright positions, blades mounted in the respective rolls and extending through the convolutions of the respective grooves to sever the stems of ears of corn which enter opposed portions of said grooves, said rolls having adjacent their upper ends roughened portions cooperating to move the stalks between the same, and means for moving said rolls along the row of corn stalks and for rotating said rolls in opposite directions.

SAMUEL E. MORRAL.
OSCAR G. MORRAL.

REFERENCES CITED

The following references are of record in the file of this patent:

UNITED STATES PATENTS

| Number | Name | Date |
|---|---|---|
| 461,246 | Meader | Oct. 13, 1891 |
| 914,465 | Stone | Mar. 9, 1909 |
| 1,083,388 | Conner | Jan. 6, 1914 |
| 1,432,912 | Scholl et al. | Oct. 24, 1922 |
| 1,539,874 | Scholl et al. | June 2, 1925 |
| 1,770,230 | Dusek | July 8, 1930 |
| 2,096,588 | King | Oct. 19, 1937 |
| 2,434,124 | Schaaf | Jan. 6, 1948 |